US007606872B2

(12) United States Patent
Stevenson et al.

(10) Patent No.: US 7,606,872 B2
(45) Date of Patent: Oct. 20, 2009

(54) SYSTEM AND METHOD FOR INTEGRATED, MULTIPLE-REMOTE CONTROLLED COMPUTER MEDIA SERVER

(75) Inventors: George E. Stevenson, Kowloon (HK); Leslie Alan Leech, Kowloon (HK); James R. W. Phillips, Bellevue, WA (US); David J. Rye, Kent, WA (US)

(73) Assignee: X10 Wireless Technology, Inc., Kent, WA (US)

( * ) Notice: Subject to any disclaimer, the term of this patent is extended or adjusted under 35 U.S.C. 154(b) by 896 days.

(21) Appl. No.: 10/456,049

(22) Filed: Jun. 6, 2003

(65) Prior Publication Data

US 2004/0236864 A1 Nov. 25, 2004

Related U.S. Application Data

(60) Provisional application No. 60/471,795, filed on May 19, 2003.

(51) Int. Cl.
*G06F 15/16* (2006.01)

(52) U.S. Cl. ....................... 709/217; 709/203; 709/231; 725/47; 725/58

(58) Field of Classification Search ................. 709/203, 709/217, 227, 231, 232; 725/47, 58; 348/552
See application file for complete search history.

(56) References Cited

U.S. PATENT DOCUMENTS

| | | | | |
|---|---|---|---|---|
| 5,850,340 A | | 12/1998 | York | |
| 6,084,638 A | * | 7/2000 | Hare et al. | 348/552 |
| 6,239,845 B1 | * | 5/2001 | Itagaki et al. | 348/552 |
| 6,377,861 B1 | | 4/2002 | York | |
| 6,545,722 B1 | * | 4/2003 | Schultheiss et al. | 348/552 |
| 6,678,737 B1 | * | 1/2004 | Bucher | 709/231 |
| 7,130,616 B2 | * | 10/2006 | Janik | 348/552 |
| 2005/0028208 A1 | * | 2/2005 | Ellis et al. | 725/58 |
| 2005/0251827 A1 | * | 11/2005 | Ellis et al. | 725/47 |

* cited by examiner

*Primary Examiner*—Ramy M Osman
(74) *Attorney, Agent, or Firm*—Black Lowe & Graham, PLLC

(57) ABSTRACT

A system and method providing a media server system are disclosed. A software module for storage on a computer and operable by the computer is provided to receive a media request for a media selection from a media source including video and audio data. The media selection is retrieved, and a media signal conveying the media selection is communicated. A communications hub receives the media signal and transmits the media selection for play on a remote media device. A receiver configured to communicate with the communications hub and with the remote media device receives the media selection and communicates the media selection to the remote media device for play. A set of media preferences associated with an identifier allows for selectable access to media content. A plurality of remote interfaces each can be coded for generating an identifier, whereby using a particular remote interface invokes a set of media preferences.

10 Claims, 8 Drawing Sheets

SYSTEM AND METHOD FOR INTEGRATED, MULTIPLE-REMOTE CONTROLLED COMPUTER MEDIA SERVER

PRIORITY CLAIM

This invention claims priority from U.S. Provisional Application No. 60/471,795, entitled "SYSTEM AND METHOD FOR INTEGRATED, MULTIPLE-REMOTE CONTROLLED COMPUTER MEDIA SERVER," filed May 19, 2003.

FIELD OF THE INVENTION

This invention relates generally to media presentation and, more specifically, to remote control of media presentation.

BACKGROUND OF THE INVENTION

Improved price-performance of digital transducers, microprocessors, memory, storage, storage media, communications equipment and other devices has made possible widespread proliferation of digital audio and video media in many forms. The ubiquity of personal computers now permits countless people to access web sites from which they can access digital pictures and audio. In fact, personal computers have become such a popularly used device that it is not unusual for multiple personal computers to be found in a single home, with these computers possibly being networked with each other to share resources. However, personal computers and media available via the Internet is only one aspect of the proliferation of digital media.

Prerecorded digital media have also become commonplace. Compact discs (CDs) and digital video discs (DVDs) can be found virtually everywhere. These discs allow users to build libraries of music, audio books, movies, and other forms of entertainment by making a relatively small investment and allowing for such a collection to be stored in a relatively small space. Similarly, in many homes digital cable or satellite television reception devices can be found, thereby allowing television viewers to access a vast number of programs of high audiovisual quality. Increasingly, digital satellite radio is becoming more popular in homes and automobiles, similarly allowing users access to programs high in audiovisual quality.

In addition, the reduced cost of digital recording devices allows people to even further participate in the digital realm by creating their own digital audio and video media. Standard compact disc recorders and miniature compact disc recorders allow people to create their own compilations from other prerecorded media accessed from discs or from networks such as the Internet. Such equipment also can be used for recording audio that was not previously recorded. Also, MP3 players allow for highly compressed audio files to be recorded onto computer storage disks or downloaded into small portable players.

Further, the affordability of digital cameras and video cameras allow for users to create digital photographs and movies. These digital photographs and movies can be stored on computer hard disks and transmitted via networks so that these digital video or audiovisual works can be shared with others.

For all these advancements in digital media technology, there remains a significant problem. While a user can view digital photographs on a computer monitor or listen to MP3 files through the speakers on a computer, accessing digital media this way leaves much to be desired. Computer screens are typically fairly small and, at the least, are considerably smaller than most television screens. Similarly, few computers have audio subsystems and speakers that can reproduce music as well as even modest home or even portable stereo units. Also, most people do not have their computers set up in their living rooms or other parts of their homes where they typically receive guests, making it more difficult to share their media files with those guests. It is also likely that the computer may not be located near the televisions or stereos on which users might want to access their media files. It would enhance the enjoyment of digital video and audio recordings if users could access their computer-stored media files on a device better suited to appreciate those files, regardless of the proximity of the media device with respect to the computer.

Moreover, where there are various forms and stores of media residing on a computer in a home or other environment, it is possible that people might want to be able to access the media files stored on that computer at more than one other location. Those people also might want to access those media files at the same time. One issue presented by this is determining how different users can access this media at a single time. Another issue is the possibility that some of the media content stored on the computer is not appropriate for all persons who may want access to other media stored on that computer. For one example, one person in this environment may not like the music stored by another person in the environment. For another example, one person may wish to store his or her photographs on the server, but may or may not want others in the environment to have access to these photographs. For still another example, music with adult lyrics may not be appropriate for younger persons who may have their own, general-audience-appropriate music stored on the computer. Having personalized and secured means of access to media files is highly desirable.

Thus, there is an unmet need in the art for a media server technology allowing a personal computer to deliver media files to multiple devices, potentially simultaneously, while providing selective access to certain users to limit stored content to those for whom it is appropriate or desirable.

SUMMARY OF THE INVENTION

The present invention comprises a system and a method for providing media content from a computer to media devices at locations remote from the computer. Embodiments of the present invention take advantage of computers' inexpensive, high capacity, and high speed storage capabilities and use a computer as a media server for various types of media for other computers, televisions, stereos, or other media devices. The computer stores prerecorded media selections or provides access for media broadcast services such as television, radio, streaming video or audio, and other sources. A software module on the computer works with a communications hub coupled with the computer to retrieve and transmit desired media selections. One or more remote media receivers coupled with media devices allow users to access media selections at locations remote from the computer. Thus, the computer can act as a media server to send pictures or videos to televisions, or to send music to stereos or other audio-capable devices. Identifier codes associated with user interface controls invoke a set of media preferences to control access to types or categories of media selections available at the remote locations.

More specifically, embodiments of the present invention provide a system and method for presentation of media content from a computer on a media device operable for presenting audio, video, or audiovisual media. A software module for storage on a computer and operable by the computer is provided to receive a media request for a media selection from a media source including video and audio data. The software module also is operable to retrieve the media selection in response to the media request, and to cause the computer to generate a media signal conveying the media selection. A communications hub in communication with the computer is configured to receive the media signal from the computer and transmit the media selection for play on the remote media device. A media receiver is configured to communicate with the communications hub and with the media device to receive the media selection from the communications hub and communicate the media selection to the media device for play. A plurality of remote interfaces each can be coded for generating an identifier, whereby using a particular remote interface invokes a set of media preferences.

In accordance with further aspects of the present invention, the media source accessible through the computer includes at least one of prerecorded media and a broadcast media source. The broadcast media source includes a service providing audio and video signals to the computer via cable, satellite, broadcast or other transmission media. The media receiver is configured to communicate with a plurality of media devices and the software module permits selection of which of the plurality of media receivers and media devices to which the media selection is directed. A plurality of addressable media receivers can be used, each of the media receivers being configured to communicate with the communications hub and with at least one of a plurality of media devices.

In accordance with other aspects of the invention, the software module provides a user interface configured to display information to a user and accept the media request from the user. The user interface may be a local interface of the computer wherein the software module is configured to use a computer monitor to display information to the user and uses a computer input device to accept the media selection from the user. The user interface also may be a remote interface in communication with the computer wherein the software module is configured to use a remote media device to display information to the user and use a remote input device to accept the media selection from the user. In the case of a remote interface, the remote interface may display information on a television, a video monitor, or a remote computer and a remote computer monitor. The remote interface may be configured to communicate the media request from the user to the software module via the communications hub.

In accordance with additional aspects of the invention, a plurality of coded remote interfaces may be provided. Each of the plurality of coded remote interfaces generates an identifier, with the identifier invoking a set of media preferences. The set of media preferences may include a predefined media type for an associated media device associated with the coded remote interface. The predefined media type may be an image medium, a video medium, an audio medium, or an audiovisual medium. Also, the set of media preferences may include a user selectable preference among media content stored on the computer. The set of media preferences may include a discretion limit such that a master user of the system can limit other users of the system from accessing at least one of a media type and specific media content.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a system and method for presentation of media content from a computer on a media device operable for presenting audio, video, or audiovisual media. A software module for storage on a computer and operable by the computer is provided to receive a media request for a media selection from a media source including video and audio data. The software module also is operable to retrieve the media selection in response to the media request, and to cause the computer to generate a media signal conveying the media selection. A communications hub in communication with the computer is configured to receive the media signal from the computer and transmit the media selection for play on the remote media device. A media receiver is configured to communicate with the communications hub and with the media device to receive the media selection from the communications hub and communicate the media selection to the media device for play. A plurality of remote interfaces each can be coded for generating an identifier, whereby using a particular remote interface invokes a set of media preferences.

Figure 1A:
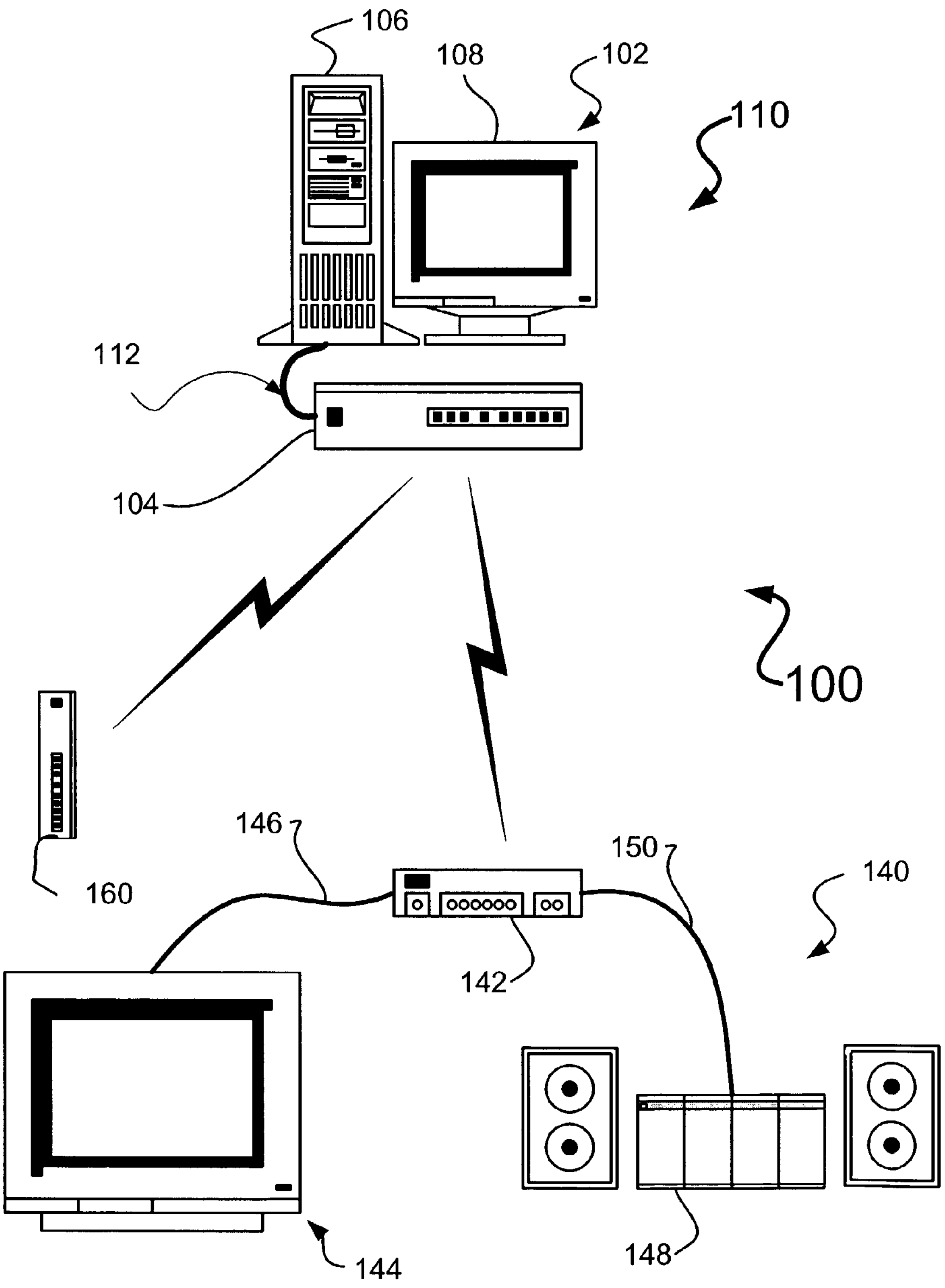
FIG. 1A is a system diagram of an embodiment of the present invention.

FIG. 1A is a system diagram of an embodiment of the present invention. The system 100 includes a computer 102 and a communications hub 104 which together comprise a media server 110. The computer 102 includes a system unit 106 housing a processor, memory, storage, and associated control devices. The computer also includes a monitor 108 and user interface devices (not shown) such as keyboard, mouse, joystick or other devices to provide for local user interaction with the computer. Local user interaction provides for configuring the system, loading and monitoring of media content, adjustment of system parameters, and other functions consistent with the present invention. The computer also contains hardware and software for loading or receiving media content, such as compressing and loading prerecorded compact discs, Internet downloading of audio or audiovisual files, uploading of digital pictures from a digital camera via a serial or USB cable, receiving streaming content from a network, and other computer media access processes. A software module (not shown) is loaded on the computer 102 to enable communication between the computer and the communication hub 104, to provide for user selection of media content, retrieval and relay of media selections, and other functions supported by embodiments of the present invention.

The communications hub 104 is coupled with the computer 102 for wired or wireless communication. In the exemplary embodiment shown in FIG. 1A, the communications hub 104 is coupled to the computer with a suitable cable 112 which, in one presently preferred embodiment, allows the communications hub 104 to communicate with the computer 102 via a standard port (not shown) such as a serial, USB, or other port. In one presently preferred embodiment, the communications hub 104 receives media request signals, passes the signals to the computer 102 to cause the computer to retrieve media selections, and transmits media signals representing the media selections.

Figure 1B:
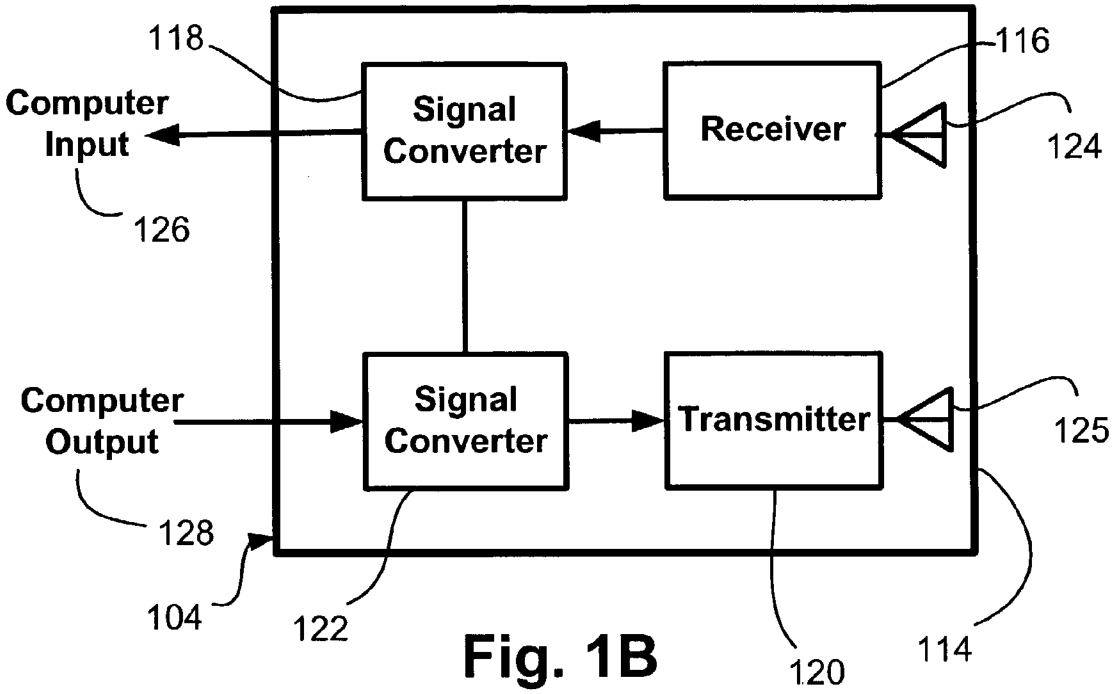
FIG. 1B is a block diagram of a communications hub shown in FIG. 1A.

FIG. 1B is a block diagram of one embodiment of the communications hub 104. The communications hub 104 shown includes six components: a housing 114, a receiver 116, a receiver signal converter 118, a transmitter 120, a transmitter signal converter 122 and antennae 124 and 125. Antenna 124 is connected with an input of the receiver 116, while antenna 125 is connected to an output of the transmitter 120.

An output of the receiver 116 is coupled with an input of the receiver signal converter 118. Thus, for example, if the receiver 116 receives analog RF signals, the receiver signal converter 118 converts the signals to digital and communicates them to the computer (not shown in FIG. 1A). An output of the receiver signal converter 118 is coupled with a computer input 126. The output of the receiver signal converter 118 coupled with the computer input 126 is received by the computer 102 and processed by the software module (not shown) according to an embodiment of the present invention.

Correspondingly, an input of the transmitter signal converter 122 is coupled with a computer output 128. The computer output 128 provides a signal from the computer (not shown), such as a media signal representing a media selection retrieved by the software module (not shown). The transmitter signal converter 122 converts the media signal as appropriate for transmission. An output of the transmitter signal converter 122 is coupled with an input of the transmitter 120. The transmitter 120 broadcasts converted media signals through the antenna 124.

Although connections between the signal converters 118 and 122 of the computer hub 104 with the computer input 126 and computer output 128, respectively, are shown as separate connections in FIG. 1B, both connections could be made by a single connector. For example, a cabled connection to a serial port, a USB port, or other bidirectional port could be used to couple the computer (not shown in FIG. 1B) and the communications hub 104.

In such an embodiment of the communications hub 104, the communications hub 104 is controlled by the computer (not shown in FIG. 1B) through the computer input 126 and the computer output 128. Functions of the communications hub are directed by the software module or other elements of the computer (not shown in FIG. 1B). The communications hub 104 could support other functions internally through the addition of a processor, memory, control logic, and other components as desired.

Referring back to FIG. 1A, the media server 110 communicates with a remote media receiver 140. As depicted in FIG. 1A, communication between the media server 110 and the remote media station 140 is through a wireless medium. Nonetheless, conventional wired cabling, optical fiber, or other communication conduits can be used within the concept of the present invention.

The remote media station 140 includes a media receiver 142, a television 144, and a communications cable 146 coupling the television 144 with the media receiver 142. The communications cable 146 could be a two-conductor video cable with RCA-type plugs on its ends, an S-video cable, or another suitable video input cable for the television 144. The remote media station 140 also includes a stereo 148 and a communications cable 150 coupling the stereo 148 with the media receiver 142. The communications cable 150 could be a multiple conductor stereo cable with RCA-type plugs on its ends or another suitable audio input cable for the stereo 148. A wireless remote control 160 is used to control media selection at the remote media station 140 through wireless interaction with the media server 110 through the communications hub 104. The remote media receiver 142 and the remote control 160 both are explained in more detail below.

One presently preferred embodiment employs wireless remote controls 160 transmitting at a frequency of 310 MHz directly to the communications hub 104. Media to the remote media receivers 142 at the remote media stations using 2.4 GHz wireless transmission.

The remote control 160 could also be a wired remote control or could be a user control panel integrated with the remote media receiver 142. Alternatively, instead of communicating directly with the communications hub 104, the remote control 160 also could communicate with the remote media receiver 142 which, in turn, communicates with the communications hub 104.

The remote media receiver 142 receives from the communications hub 104 both media information and media selections. Media information, in one embodiment, is visual information communicated to the television 144 and displayed on the television screen, as will be further described below. Media selections, in that same embodiment, are music files which are communicated to the stereo 148 and played through its speakers. Using the remote control 160, a user can make a media request according to media information displayed on the television 144. The request, which is communicated to the media server 110 through communications from the remote control 160 to the communications hub 104, is processed by the software module (not shown). In response to the request, a desired media selection is retrieved by the software module from the computer 102, and a media signal is transmitted by the communications hub 104 to the remote media receiver 142. The remote media receiver 142 extracts the media selection from the transmission and passes the media selection to the stereo 148 to be played. Methods by which the remote control 160 communicates with the communications hub 104 and by which the communications hub communicates with the computer 102 and the remote media receiver 142 to transmit media information and media selections are explained in U.S. Pat. No. 5,850,340 for "INTEGRATED REMOTE CONTROLLED COMPUTER AND TELEVISION SYSTEM" and U.S. Pat. No. 6,377,861 for "INTEGRATED REMOTE CONTROLLED COMPUTER AND TELEVISION SERVER," incorporated by reference.

Figure 1C:
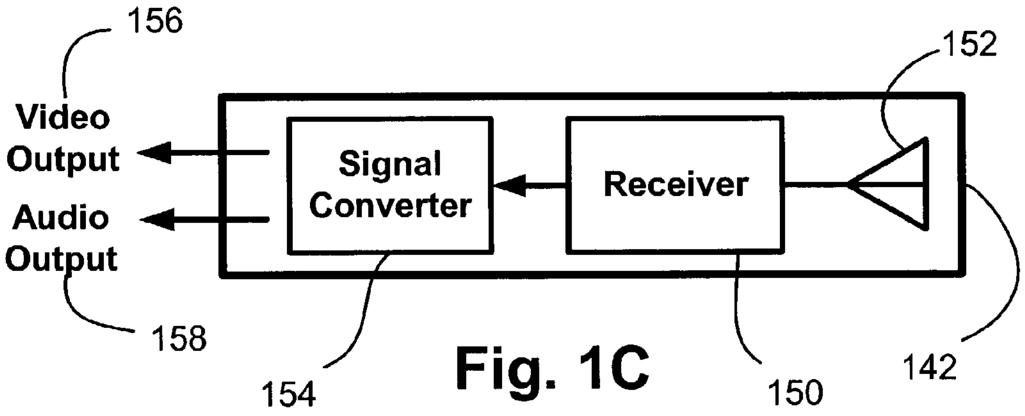
FIG. 1C is a block diagram of a remote media receiver shown in FIG. 1A.

FIG. 1C shows a block diagram of the remote media receiver 142. The remote media receiver 142 is similar to receiving circuitry of the communications hub 104 (FIG. 1B). In particular, the remote media receiver 142 includes a receiver circuit 150 and an antenna 152 for receiving signals transmitted by the communications hub 104. The received signals are processed by a signal converter 154 to extract video, audio, or audiovisual signals from the received signals. Outputs of the signal converter 154 include a video output 156 and an audio output 158. Multiple media devices can be coupled with the remote media receiver 142. Thus, for one example, coupling the video output 156 of remote media receiver 142 to the television 144 (FIG. 1A) allows a user to access visual media or make media selections from information displayed to the user on the television 144. Coupling the audio output 158 of the remote media receiver 142 to the stereo 148 (FIG. 1A) and allows an audio media selection to be played on stereo 148.

Figure 1D:
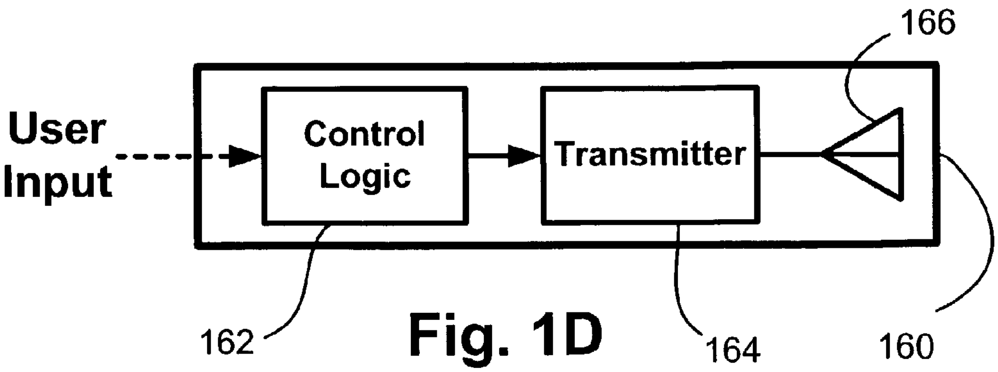
FIG. 1D is a block diagram of a remote control shown in FIG. 1A.

FIG. 1D shows a block diagram of the remote control the remote media station includes a wireless remote control 160. The remote control 160 includes both a familiar keypad driven user interface (not shown) which is governed by control logic 162 which produces control sequences in response to user actuation of keys on a keypad. The sequences produced are broadcast by a transmitter 164 through an antenna 166. The remote control 160, as shown in FIG. 1, communicates wirelessly to the communications hub 104.

FIG. 2A-2F depict an example of the operation of the system 100 of FIG. 1A to make media requests to access media selections. The computer 102 and the communications hub 104 of the media server 110 are activated. The remote media receiver 142, the television 144, and the stereo 148 are similarly activated. The television 144 is tuned to a video input or channel on which the input from the remote media receiver 142 is received. Similarly, the stereo 148 is set to an auxiliary input or another input at which the input from the remote media receiver is received.

In this example, a user accesses media from the remote media station 140 (FIG. 1A) using a remote control 160 with a control keypad (not shown). Media also could be accessed at the media server 110, using input devices (not shown) of the computer 102 in response to information displayed on the computer monitor 108. Using conventional input devices, a user could access media selections through a graphical interface using a pointing device. Similarly, with a remote control 160 with a pointing device, a user at the remote station 140 also could access media selections through a graphical interface using the pointing device of the remote control 160.

Figure 2A:
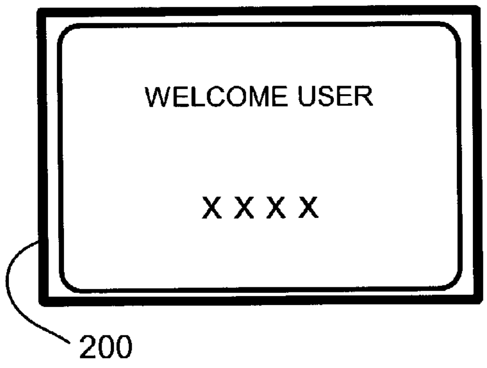
FIGS. 2A-2F show screen displays showing media information related to media selections shown to a user of the system.

FIG. 2A shows an initial screen 200. An initial screen may welcome the user to the system, offer instructions, display an identifier associated with the remote control 160 (FIG. 1A) used to access the system, or display other information. The remote control 160 may be associated with an identifier with which preferences associated with the user of the remote control, or the identifier may allow access to a set of media preferences which may not be available to other users of the system. The operation of the identifier and how a set of media preferences can be associated with the identifier are described below in connection with FIGS. 5A and 5B.

Figure 2B:
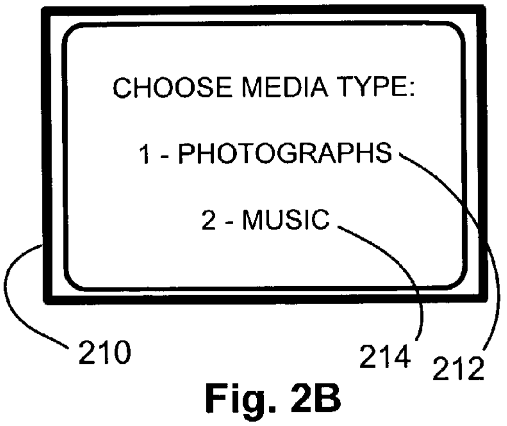

Referring to FIG. 2B, at a second screen 210 the user is presented with initial media type choices. In the exemplary embodiment shown, the system is configured as a media server for "1-PHOTOGRAPHS" 212 and "2-MUSIC" 214. The system also could be configured as a media server for audiovisual works. Using a keypad (not shown) on the remote control 160 (FIG. 1A), the user can select "1" for "PHOTOGRAPHS" or "2" for "MUSIC." In the present example of FIGS. 2A-2F, the user selects "2" to choose "MUSIC."

Figure 2C:
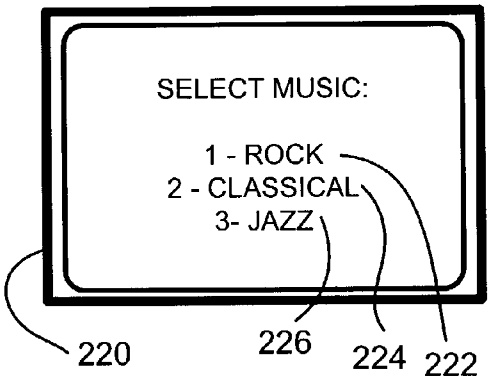

Referring to FIG. 2C, at a third screen 220 after having chose "MUSIC" at the second screen, 210 the user is now presented with a choice of music genres that are stored on the system 100 or are available according to the identifier invoking a set of media preferences as previously described. In particular, the user is given a choice of "1-ROCK" 222, "2-CLASSICAL" 224, and "3-JAZZ" 226. Using the keypad (not shown) on the remote control 160 (FIG. 1A), the user can select "1" for "ROCK," "2" for "CLASSICAL," or 3 for "JAZZ." In the present example of FIGS. 2A-2F, the user selects "1" to choose "ROCK."

Figure 2D:
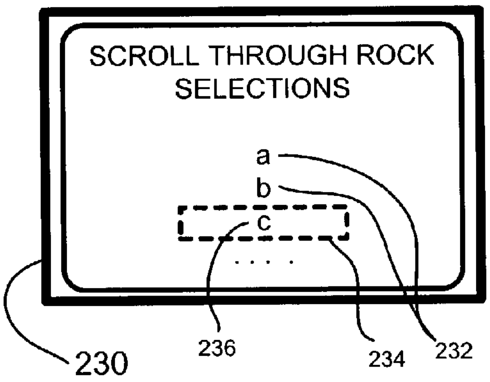

Referring to FIG. 2D, at a fourth screen 230, the user now has a choice of rock selections 232 through which the user can scroll. The selections 232 can be albums, compilations made by the user, individual tracks, or other music files. A choice indicator 234 which the user can scroll across the selections appears around choice "c" 236. The choices are listed by letter only for sake of example; artist name, song name, album name, a representative icon, or other information could be displayed for the purpose of allowing the user to choose. Using the choice indicator 234 which the user manipulated into place using directional keys on the remote control 160 (not shown in FIG. 2D), the user has marked choice "c" 236. The user can select choice "c" 236 by pressing an enter or select key (not shown) on the remote control 160 (not shown in FIG. 2D).

Figure 2E:
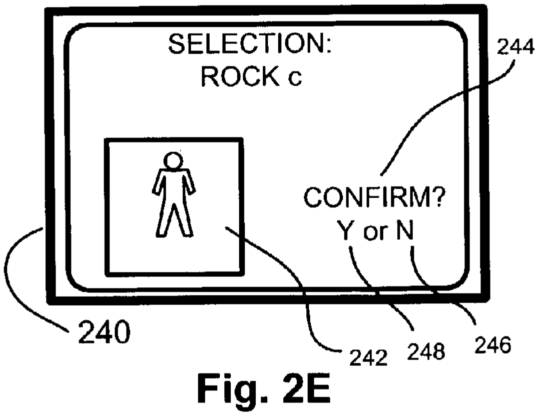

Referring to FIG. 2E, a fifth screen 240 shows a user's ability to browse and confirm selections before they are actually retrieved to be played. On the fifth screen 240, the system 100 confirms with the user that the user has chosen choice "c" 236. Additional information also can be presented to the user, including graphical information 242 which might be an album cover or a photograph of the artist. On reviewing the graphical information 242, the user may be given a prompt 244 to confirm the user's selection of choice "c" 236. The user can confirm or reject the choice by pressing an indicated key on the keypad (not shown) on the remote control 160 (FIG. 1A). Choosing "N" 246 would return the user to an earlier screen to make a different selection. Choosing "Y" 248 confirms the user's choice to initiate retrieval and playback of the media selection.

Figure 2F:
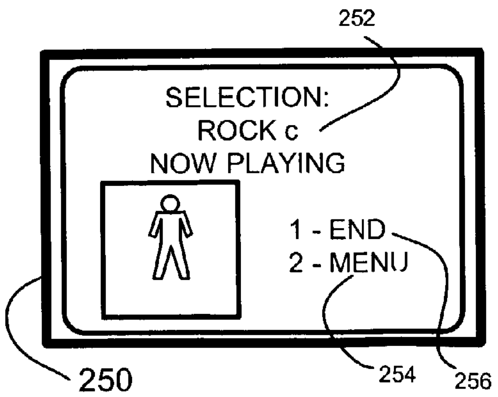

Referring to FIG. 2F, a sixth screen 250 shows the graphical information 242 associated with the user's choosing choice "c" 236 and a confirmation 252 that the selection is now playing. Different graphical information could be displayed, with such information relating or not relating to the choice "c" 236. For example, the user might choose to "2-MENU" 254 and opt now to return to the first screen 200 (FIG. 2A) to "1-PHOTOGRAPHS" to view personal or other photographs while listening to the musical selection choice "c" 236. The user could also choose to watch a television program or access another form or selection of media. Alternatively, choosing "1-END" 256 stops the media selection from playing.

In addition to the screens 200, 210, 220, 230, 240, and 250 shown in FIGS. 2A-2F, other screens can be presented to the user. For example, a user media device and the remote media receiver to which the media selection should be directed. Also, the user may be prompted as to whether the user wishes to make any changes in a set of media preferences associated with the identifier used by the user should be updated. Again, setting and changing of user preferences is described in more detail below in connection with FIGS. 5A and 5B.

Figure 3:
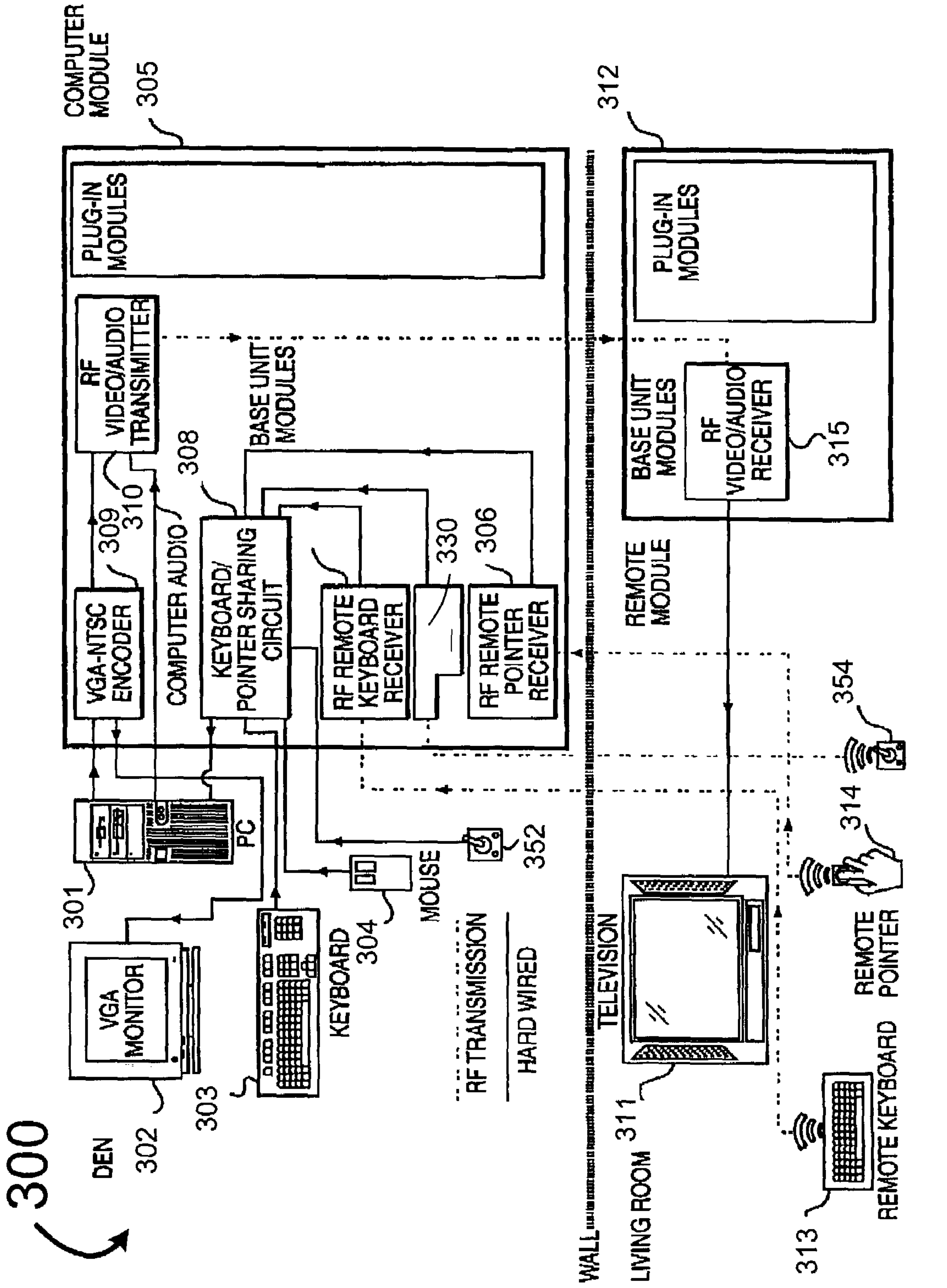
FIG. 3 is a block diagram of the configuration of the components of an embodiment of the present invention showing a server and a remote media station including a television as a media device.

FIG. 3 shows a more detailed block diagram of a system 300 according to an embodiment of the present invention. In particular, FIG. 3 shows a system 300 having a server 300*a* and a remote media station 300*b*, the remote media station 300*b* having a television 311 as a media device. The server 300*a* includes a personal computer 301, a monitor 302, a wired keyboard 303, and a wired mouse 304. All four of these components electronically communicate by wire to a communications hub 305, although wireless communications may also be used. The communications hub 305 includes a local receiver, a computer controller, and a local transmitter for receiving request signals from the remote media stations, responding to the request signals, and transmitting media signals representing the media selections made by the users. The communications hub 305 includes a radio frequency ("RF") remote pointer receiver 306, an RF remote keyboard receiver 307, an optional RF remote joystick receiver 330, a keyboard, pointer, joystick switch device or sharing circuit 308 (shown in the figures as the keyboard/pointer sharing circuit 308), a power circuit (not shown), a NTSC encoder 309, and an RF video and audio transmitter 310.

The communications hub 305 may be sold as a separate product which is plug compatible with the personal computer 301, monitor 302, keyboard 303, and mouse 304. An optional joystick 352 may also be included with the communications hub 305 which is plug compatible with the personal computer 301. Any compatible joystick may be used for joystick 352.

The system further uses a television 311, a remote module 312, a remote wireless keyboard 313, and a remote wireless pointer 314. An optional remote joystick 354 may also be included with the remote module 312. The remote module 312 includes an RF video and audio receiver 315. The remote module 312 may be sold as a separate product that is plug compatible to the input terminals or plugs of the television 311.

The television 311, remote module 312, wireless remote keyboard 313, and wireless remote pointer 314 may be in a room together. This room may be the living room and separate from another room, perhaps a den, in which is contained the personal computer 301, its monitor 302, keyboard 303, mouse 304, and communications hub 305.

The present invention may use an integrated keyboard with a trackball, or a separate trackball device. Any cursor control device may be used, either integrated with a keyboard or as a separate device. For example, a touch pad can be used, either integrated with a keyboard or as a separate device. Any such device to control or create symbols or images on a display may be used with the present invention, including wired devices and wireless versions of the same devices. In the preferred embodiment, no wireless touch pad is currently recommended.

One presently preferred embodiment of the present invention may packaged to include the communications hub 305, the remote module 312, and the wireless remote pointer 314 which may be in the form of an integrated joystick to support handheld operation. A wireless keyboard 313 may also be included or available as an option to enhance system control and media entry. These devices can then be used by the consumer together with the television 311, the personal computer 301, a VCR, and other components discussed herein.

The personal computer 301 communicates by wire to the NTSC encoder 309, the keyboard, pointer, joystick switch device 308 and the RF video/audio transmitter 310. The monitor 302 electronically communicates by wire to the NTSC encoder 309. The keyboard 303 electronically communicates by wire to the keyboard, pointer, or joystick switch device 308. The mouse 304 electronically communicates by wire to the keyboard, pointer, or joystick switch device 308. The optional joystick 352 electronically communicates by wire to the keyboard, pointer, or joystick switch device 308. Furthermore, inside the communications hub 305, the keyboard, pointer, joystick switch device 308 communicates electronically by wire with the RF remote keyboard receiver 307, the RF remote joystick receiver 330 and the RF remote pointer receiver 306. Also, the NTSC encoder 309 electronically communicates by wire with the RF video and audio transmitter 310. The NTSC encoder 309 may be manufactured on one integrated circuit, or on one circuit board, with the switch device 308. This would allow the encoder 309 and the switch device 308 to be one sub-assembly to be incorporated into the communications hub 305. The remote pointer 314 communicates wirelessly with the RF remote pointer receiver 306. The remote keyboard 313 communicates wirelessly with the RF remote keyboard receiver 307. The optional remote joystick 354 communicates wirelessly with the optional RF remote joystick receiver 330. The RF video and audio receiver 315 wirelessly communicates with the RF video and audio transmitter 310. The television 311 electronically communicates by wire to the RF video and audio receiver 315.

The embodiment shown in FIG. 3 allows a person to use a personal computer 301 in a remote fashion while watching the computer generated display on the television 311. The user controls the cursor of the computer with the remote pointer 314, which is a hand-held pointing device, and enters keyboard data with the remote pointer keyboard 313. The control of the cursor and the entry of data by the keyboard 313 occur wirelessly by radio frequencies, and do not require communication by wire to the computer. The computer display and sounds are generated and transmitted to the television 311 for display. The pointer and keyboard commands are sent to the personal computer 301, through the communications hub 305, which may be located in a room separate from the user and the television 311. The user may be in the room with the television 311.

In the embodiment shown in FIG. 3, the system is controlled wirelessly by the user manipulating the remote pointer 314 and remote keyboard 313. The user's commands are transmitted by the pointer 314 and keyboard 313 to the communications hub 305 and are, in turn, communicated to the personal computer 301. The personal computer 301 generates a screen display which is transmitted to the communications hub 305 and displayed on the monitor 302. The communications hub 305 wirelessly transmits data to the remote module 312, causing the television 311 to display a television version of the computer generated screen display shown on the monitor 302. The screen display on the television 311 is then observed by the user.

Audio signals are generated by the personal computer 301, played by the speakers (not shown) connected to the personal computer 301, and transmitted through the communications hub 305 to the remote module 312, and played through speakers associated with the television 311. Thus, a user can select video, audiovideo, or audio only media for play on the television 311. In the embodiment shown in FIG. 3, the user may also control the system by wired keyboard 303 and wired mouse 304 while watching the monitor 302.

FIG. 3 also shows spaces for plug-in modules in the communications hub 305, and the remote module 312, that may not be used in this embodiment. Discussions of these modules that could be employed in such a system are further described in U.S. Pat No. 5,850,340 for "INTEGRATED REMOTE CONTROLLED COMPUTER AND TELEVISION SYSTEM" and U.S. Pat No. 6,377,861 for "INTEGRATED REMOTE CONTROLLED COMPUTER AND TELEVISION SERVER," previously incorporated by reference. The patents incorporated by reference also describe in detail circuitry that can be used to switch between devices and perform other functions supporting functions used by embodiments of the present invention.

Figure 4A:
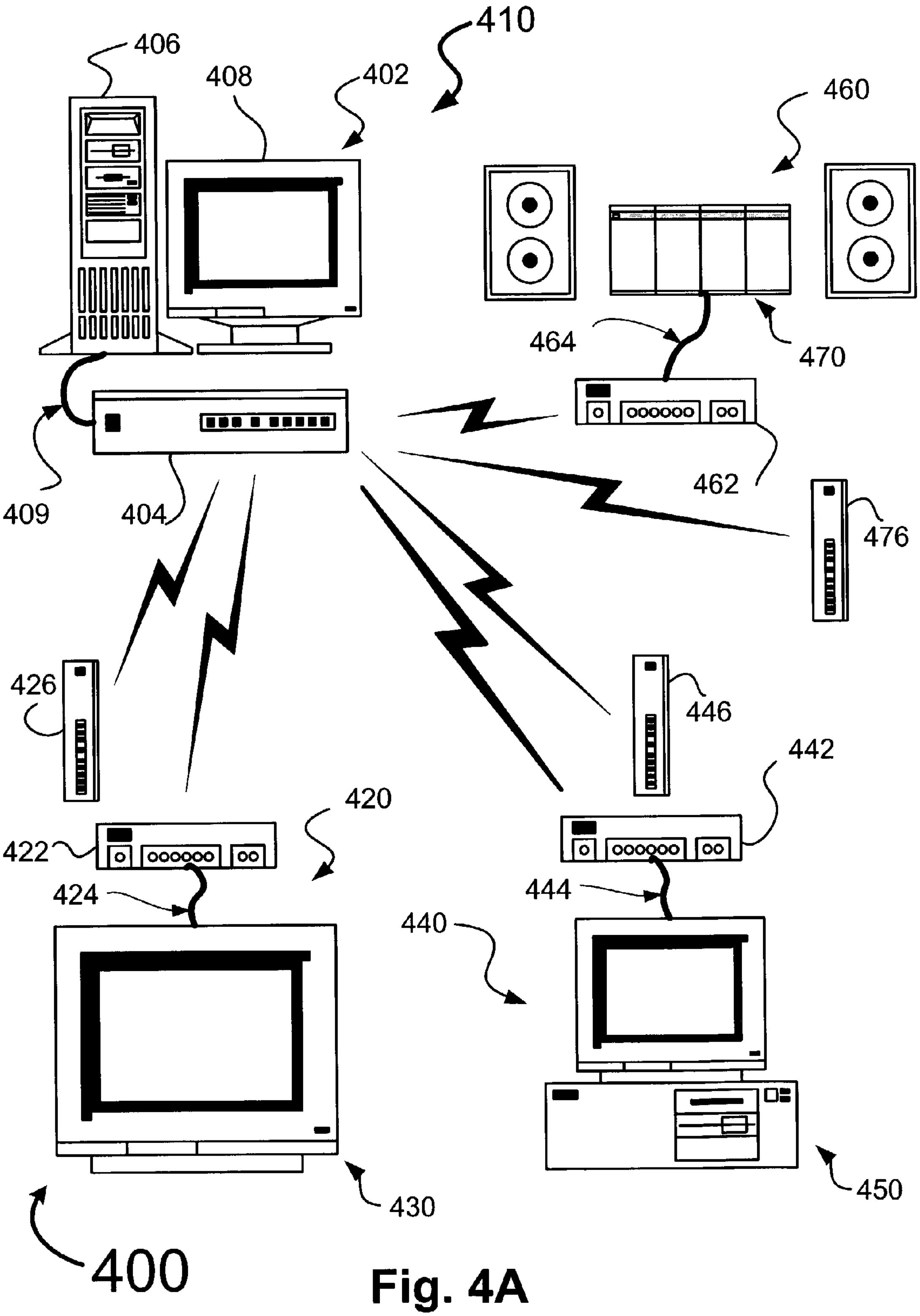
FIG. 4A is a block diagram of an alternative embodiment of the present invention in which multiple remote media stations communicate with the media server.

FIG. 4A is a system diagram of an alternative embodiment of the present invention featuring a plurality of remote media stations 420, 440 and 460. The system 400 includes a computer 402 and a communications hub 404 which together comprise a media server 410. The computer 402 includes a system unit 406 housing memory, storage, and associated control devices, as well as a monitor 408 and user interface devices (not shown) to provide for local user interaction with the computer. Local user interaction provides for configuring the system, loading and monitoring of media content, adjustment of system parameters, and other functions consistent with the present invention and other computer functions. The computer 402 also includes hardware and software for loading or receiving media content, such as compressing and loading prerecorded compact discs, Internet downloading of audio or audiovisual files, uploading of digital pictures from a digital camera via a serial or USB cable, receiving streaming content, and other computer media access processes. The computer 402 is coupled with the communications hub 404. The communications hub 404 which receives media request signals, directs the computer 402 to retrieve media selections, and transmits media signals representing the media selections.

In the exemplary embodiment of the system 400 shown in FIG. 4A, the server 410 communicates wirelessly with a plurality of remote media stations 420, 440, and 460. Thus, the communications hub 404 includes a receiver, a transmitter, and desired antennae for the receiver and the transmitter, as previously described in connection with FIG. 1B. In one presently preferred embodiment previously described, wireless remote controls transmit at a frequency of 310 MHz directly to the communications hub 104. Media signals carrying desired media selections are transmitted from the communications hub 104 to the remote modules using 2.4 GHz wireless transmitters.

The communications hub 404 is coupled to the computer with a suitable cable 409 which, in one presently preferred embodiment, allows the communications hub 404 to communicate with the computer 402 via a standard port (not shown) such as a serial, USB, or other port. The communications hub 404 receives RF signals and generates digital signals which are passed to the computer 402 via the cable 409 and the port (not shown). Decoding of and responding to these signals are implemented by software (not shown) installed on the computer 402. The communications hub 404 also could communicate with the remote media stations 420, 440, and 460 through other mediums, such as conventional wired cabling, optical fiber, or other communication conduits.

Communications between the communications hub 404 and the remote media stations 420, 440, and 460 are implemented in a number of ways. The communications hub 404, for example, may include a single receiver and a single transmitter which are capable of multiplexing incoming and outgoing signals, respectively. Alternatively, separate transmitter or remote media receivers could be added to the communications hub to support additional remote media stations. Correspondingly, variations in configuration are possible at the remote media stations 420, 440, and 460. For example, multiple remote media stations could be controlled by a single remote control or a single remote module could interface with multiple media devices.

Of the plurality of remote media stations 420, 440, and 460 shown in FIG. 4A, each includes a media device 430, 450, and 470. Media content stored on or received by the computer 402 includes many different forms, including audio content, visual content, or audiovisual content. The media content includes both prerecorded, stored media files as well as received broadcast content such as cable and satellite television and radio, and streaming video, audio, and audiovisual content. Thus, the media devices 430, 450, and 470 include devices operable to present video or audio content, and need not all be of the same type.

A first remote media station 420 includes a television 430 as its media device. Because the television 430 can present video, audio, or audiovisual content, the first remote media station 420 is used to access video, audio, or audiovisual media content retrieved from the media server 410. The television 430 is coupled to a remote media receiver 422 via a cable 424. The cable 424 is a multiple conductor, RCA-coupler connector, an S-Video cable, or another cable known in the art for coupling a television with an input source. The first remote media station 420 also includes a wireless remote control 426 which a user employs to make media selections.

The remote control 426 could also be a wired remote control or could be a user control panel integrated with the remote media receiver 422. The remote control 426 can communicate directly with the communications hub 404 or can communicate with the communications hub 404 through the remote media receiver 422. Consequently, in one embodiment the remote media receiver 422 is just a receiver unit with the remote control 426 itself transmitting user selections to the communications hub 104. In another embodiment, the remote media receiver 422 is actually a remote media transceiver for relaying signals to and receiving signals from the communications hub 404.

Functionally, the television 430 acts as a display providing information to the user to monitor his or her selections as previously described in connection with FIGS. 2A-2F. For example, if the remote media station 420 is used to access musical selections, the television 430 could display to the user a list of available music tracks, display album covers for albums loaded on the server 410, or provide other video material to assist the user in making media selections. The television 430 also can serve as the media device for media selections chosen. The television 430 can present visual or audiovisual media, as well as present audio media selections through its speakers.

A second remote media station 440 includes a remote computer 450 as its media device. Because the remote computer 450, like the television 430, can present video, audio (through speakers not shown in FIG. 4A), or audiovisual content, the second remote media station 440 is used to access video, audio, or audiovisual media content retrieved from the server 410. The remote computer 450 is coupled to a remote module 442 via a cable 444. The cable 444 is a serial cable, a USB cable, or another cable known in the art for coupling a computer with an input source. The second remote media station 440 also includes a wireless remote control 446 which a user employs to make media selections.

A third remote media station 460 includes a stereo 470 as its media device. Unlike the television 430 and the remote computer 450, the stereo 470 is operable to present only audio content, thus, the third remote media station 460 is suited to retrieve only audio content from the server 410. The stereo 470 is coupled to a remote module 462 via a cable 464. The cable 464 is a multiple conductor, RCA-coupler connector cable or another cable known in the art for coupling a stereo with an input source.

Like the first remote media station 420 and the second remote media station 440, the third remote media station 460 in the embodiment shown includes a remote control 476. Without a visual display device such as the television 430 or the monitor associated with the computer 450, a user does not have a way to visually make media selections on the stereo

470. However, selections can be made using the display of another remote media station, such as by using the television 430 at the first remote media station 420 or the computer 450 at the second remote media station 440, and direct the media selections to the stereo 470. Alternatively, a display (not shown) could be incorporated into the remote control 476 to provide the user with feedback as to his or her media selections in providing the media content to the stereo 470 or the other media devices.

Figure 4B:
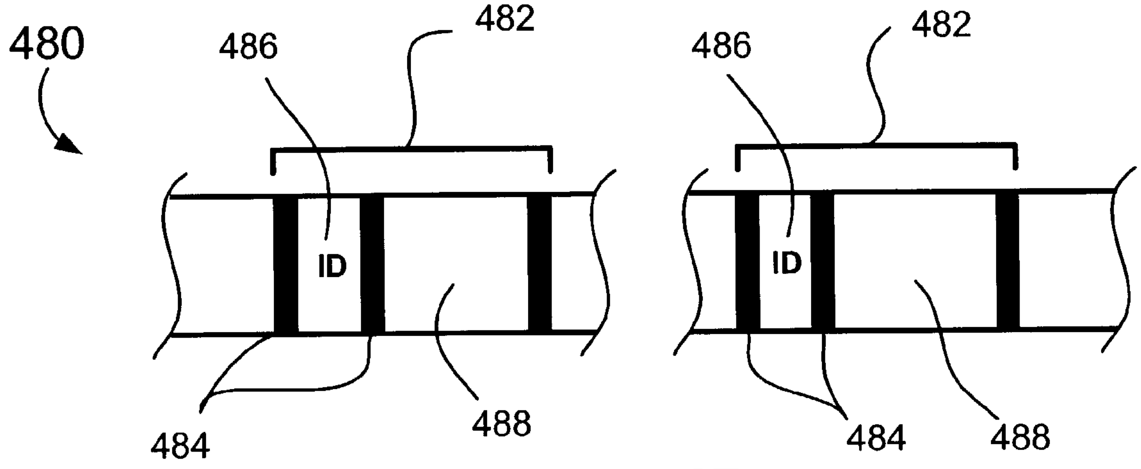
FIG. 4B is a block diagram of a media request signal including an identifier and other data related to the media request.

In the system 400 having multiple remote media stations 420, 440, and 460, it is desired to have means to allow unique identification of remote controls 426 and 446. Unique identification avoids device contention at the communications hub. Also, as previously described, unique identification allows for a set of media preferences to be invoked by the remote controls 426 and 446 or users of the remote controls 426 and 446. FIG. 4B shows a data stream structure providing for identifiers to invoke media preferences.

FIG. 4B shows a data stream 480 containing user selection blocks 482. Each of the user selection blocks is divided by marker blocks 484 which mark ends of preceding blocks and beginnings of next blocks. Each user selection block has two sections bracketed by the marker blocks 484: an identifier block 486 and a data block 488. The identifier block 486 serves two purposes previously mentioned. First, the identifier block 486 is used by the media server 410 (FIG. 4A) to differentiate between multiple requests from multiple users to avoid contention issues when multiple users access the system at the same time. Second, the identifier block 486 is used to verify that the user has authority to make the media requests entered by comparing the requests to a set of user preferences associated with the identifier, as will be described below. In the example shown in FIG. 4B, the selection blocks 482 specify an identifier "ID" in the identifier blocks 486 which in this case represents an identifier allowing the user to make the selections contained in the data blocks 488.

Figure 4C:
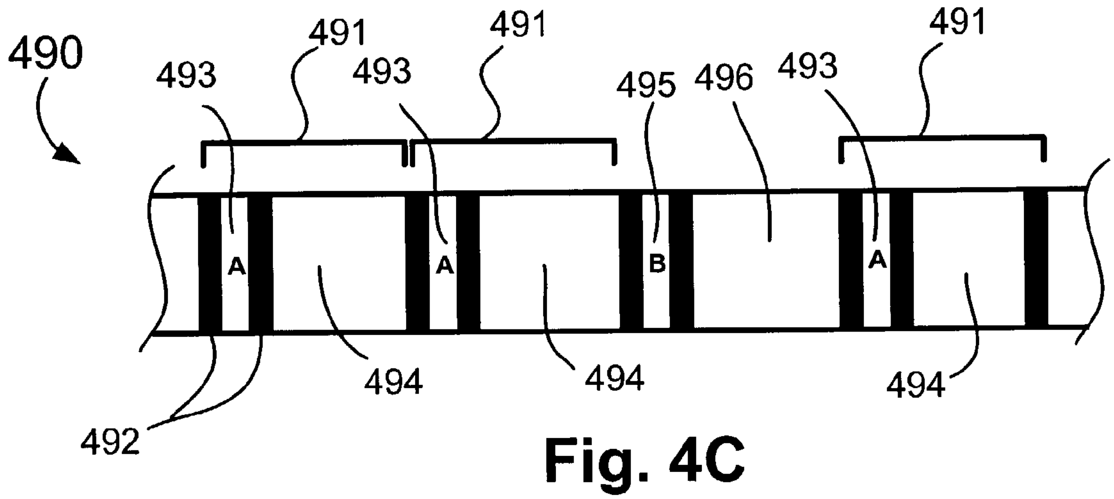
FIG. 4C is a block diagram of a data stream of outgoing signals from the media server.

Identification of signals in a multiple user/multiple station system is important both for signals received by the media server 410 (FIG. 4A) and for media signals transmitted by the media server 410. FIG. 4C illustrates a similar identifier/data protocol used for the transmission of media signals. As previously described, in one presently preferred embodiment of the invention, wireless remote controls 426 and 446 (FIG. 4A) transmit at a frequency of 310 MHz directly to the communications hub 404 (FIG. 4A). Media signals carrying desired media selections are transmitted from the communications hub 404 to the remote media receivers 422, 442, and 462 (FIG. 4A) using 2.4 GHz wireless transmitters. Accordingly, interference between incoming signals to the media server 410 and outgoing signals from the media server 410 do not interfere with each other.

FIG. 4C shows a data stream 490 of outgoing signals from the media server 410. More specifically, the data stream 490 is transmitted by the communications hub 404 in one presently preferred embodiment. The data stream 490 includes transmission blocks 491. Comparable with the user selection blocks 482 (FIG. 4B), sections of the transmission blocks are separated by transmission marker blocks 492 delineating between ends of preceding blocks and beginning of next blocks. Each transmission block 491 has two sections bracketed by the transmission marker blocks 492: a media receiver identifier block 493 and a transmission data block 494. The transmission identifier block 493 identifies to which remote media receiver 422, 442, or 462 (FIG. 4A) to which the transmission block 491 is directed. The transmission data block 494 contains an actual packet of media data to be decoded by the remote media receiver 422, 442, or 462 and presented by an associated media device 430, 450, and 470 (FIG. 4A). In the example shown in FIG. 4C, the transmission blocks 491 specify an identifier "A" in the media receiver identifier blocks 493 which are associated with one of the remote media receivers 422, 442, or 462. On receiving a transmission block 491 headed with the appropriate identifier, the appropriate receiver 422, 442, or 462 receives and decodes the associated transmission data block 494.

In the example of FIG. 4C, one can view the data stream 490 from the perspective of the remote media receiver 422, 442, or 462 (FIG. 4A) with which identifier "A" is associated. Accordingly, the remote media receiver 422, 442, or 462 receives and ultimately caused to be presented transmission data blocks 494 in transmission blocks 491 in which the identifier "A" is specified in the transmission identifier block 493. The remote media receiver 422, 442, or 462 not associated with the identifier "A" ignores other transmission blocks 491, therefore ignoring a transmission data packet 496 preceded by a transmission identifier block 495 specifying an identifier "B."

Also advantageously, embodiments of the present invention allow media preferences to be associated with the remote media stations 420, 440, and 460. The media preferences can be assigned to the remote modules 422, 442, and 462, or the remote controls 426, 446, and 466, or, directly assigned to the media device in the case of a programmable media device such as the remote computer 450.

The media preferences take many forms. First, the media preferences may reflect the capability of the media device at a remote media station. For example, the third remote media station 460 having a stereo 470 as its media device can only present audio content or only an audio component of an audiovisual presentation, such as the play-by-play of a sports telecast. Accordingly, an audio-only preference can be assigned to the remote media station 460. The media preference can be set at the remote module 462 or at the remote control 476. The media preference associated with a remote media station can be associated with a preference identifier that is transmitted from the remote module or the remote itself to the communications hub.

Second, the media preferences may reflect subject preferences of a user. A plurality of users may have their own preferences in terms of, for example, genres of music they prefer. The system 400 thus allows users to create preference lists to simplify the media selection process. At the same time, such subjective preference lists can be used to prevent other users from viewing one's own selected favorites for the sake of privacy. Accordingly, parents and children, husbands and wives, and other persons sharing an environment in which the system 400 is installed can have customized media selection preferences from which to choose. A control unit such as a remote control can have a preference identifier set at the device to personalize it for a particular user, or a user can identify himself or herself to the device by entering a preference identifier associated with his or her media preferences. As previously described, the preference identifier is transmitted to the communications hub to engage selected media preferences.

Third, as the media preferences can be used to provide some level of privacy over one's media preferences, such preferences can be used to provide discretionary or parental controls. For example, if the server 410 is operable to receive broadcast television via cable or satellite, a parent may wish to lock out minor children from accessing this content. Similarly, a user of the system may wish to access music with lyrics suited for mature audiences but wish to prevent younger users of the system 400 from accessing that music.

Again, such negative preferences can be established in the system. The preferences can be associated with a preference identifier that can be associated with a remote media station a remote control, and access to the media in question can be permitted only to the media device associated with that remote media station or remote control.

Figure 5A:
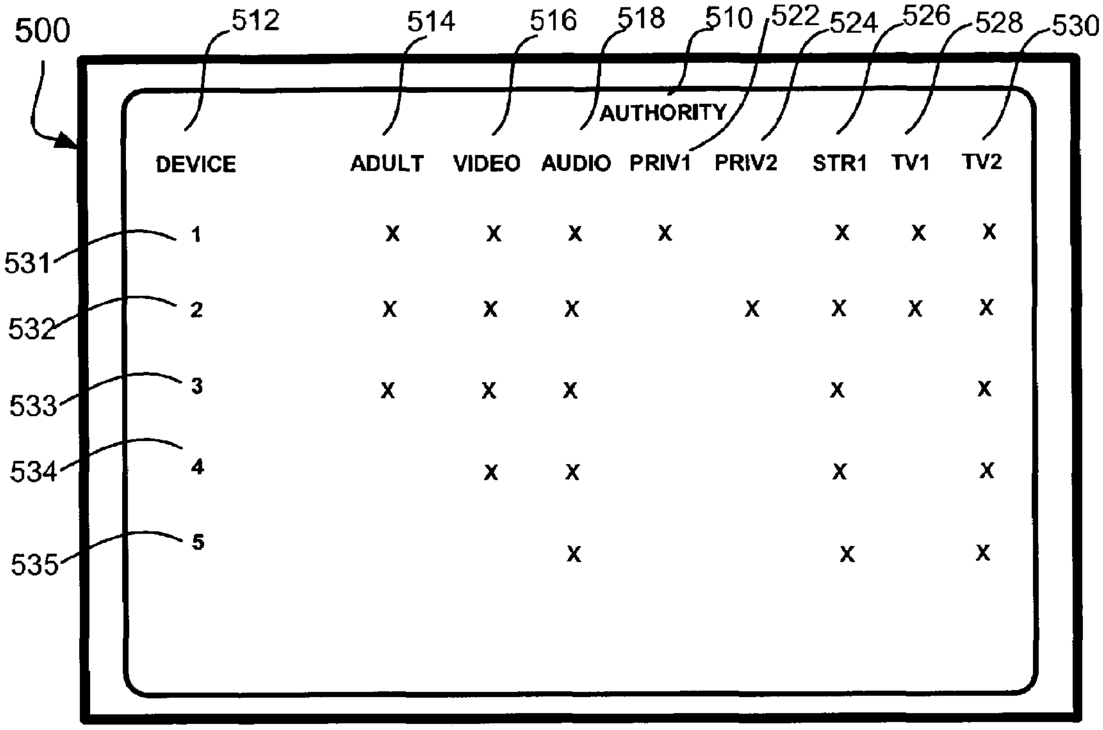
FIG. 5A is a first screen display depicting a control interface for choosing a set of media preferences associated with an identifier.
Figure 5B:
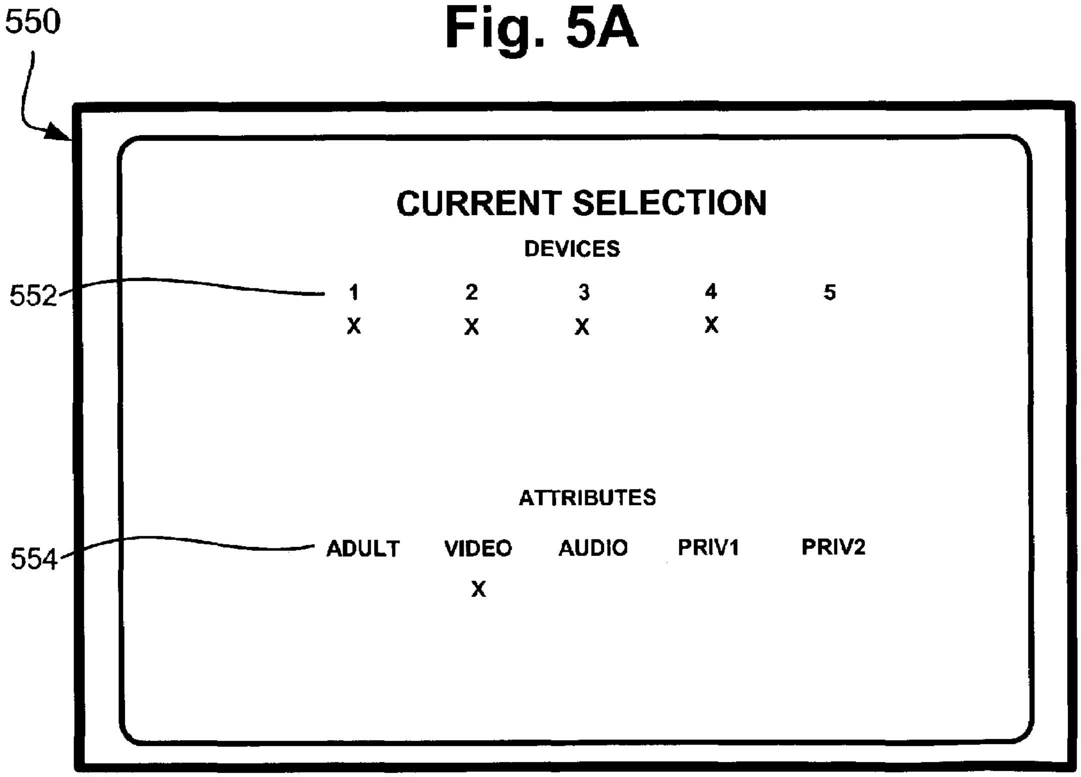
FIG. 5B is a second screen display depicting a control interface for choosing a set of media preferences associated with an identifier.

FIGS. 5A and 5B illustrate screens 500 and 550 of an interface through which a set of user preferences can be selected or updated. FIG. 5A shows a screen having a table listing devices 1 531, 2 532, 3 533, 4 534 and 5 535 on a left side and authority 510 attributes across a top side. The devices 531-535 identified here are remote controls such as 426 and 446 (FIG. 4A). In this example, a numeric identifier is assigned to each device 531-535 and access is controlled based on which device 531-535 a user is using. In such a scenario, each member of a household may have his or her own device 531-535, with the device 531-535 serving as a key allowing an "owner" of each device his or her designated access. Use of a particular device 531-535 transmits an identifier as described in connection with FIG. 4A which invokes a set of media preferences established for the user of that device 531-535.

In the embodiment shown in FIG. 5A, the authority attributes 510 determine which device 531-535 can access which classes of media and use which media devices. For example, for each device 531-535, it can be established whether the device 531-535 can access media classified, either in a broadcast stream or by a master user of the system, as "ADULT" 514. Also, it can be determined whether a device 531-535 can access "VIDEO" media 516, "AUDIO" media 518, or both. It can be established whether a device can access private archives "PRIV1" 522 and "PRIV2" 524. Also, it can be determined whether a device can be used with certain media devices "STR1" 526 which is a stereo, "TV1" 528 which is a first television, and "TV2" 530 which is a second television. The table screen 500 is a master screen which can be accessed at the computer 402 (FIG. 4A) or at a remote media station 420, 440, and 460 if the station, input device, and the user are authorized to access this screen. The interface can be graphical, permitting a point and click approach, text-based, or use another input scheme.

Access is established by checking off an authority attributes 510 appropriate to each device. For one example, device 1 531 may belong to one head of household who can access nearly everything: media that is "ADULT" 514, "VIDEO" media 516, "AUDIO" media 518, and private archive "PRIV1" 522, and use every device "STR1" 526, "TV1" 528, and "TV2" 530. The access is to almost everything because the user of device 1 531 does not have access to private archive "PRIV2" 524. Similarly, another head of household using device 2 532 can also access nearly everything, have full access to everything including private archive "PRIV2" 524 but not private archive "PRIV1" 522. Accordingly, each head of household can have his or her own private archive. Additional privacy archives could be created for other users, to which master users of the system could retain access to monitor, for example, copyright infringement or to apply parental consent to media choices.

Other devices in the system can have a range of preferences. The user of device 3 533, for example, may be a teenager deemed old enough for media that is "ADULT" 514 and have access to VIDEO" media 516, "AUDIO" media 518, and use every device except "TV1" 528, perhaps because its use by that user in its location is bothersome to other members of the household. It is possible, for example that "TV1" 528 is in a bedroom or den of the heads of household and the heads of household do not want the user of device 3 533, device 4 534, or device 5 535 to watch television or access other media in that location.

For another example, the user of device 5 535 only has privileges for "AUDIO" media 518, although the user of device 5 535 can access that media on either "STR1" 526 or "TV2" 530. For one possible example, the user of device 5 535 may have committed some act which led a head of household to revoke television privileges from the user of device 5 535 for some period of time.

Using a structure like that of screen 500, favorite lists, access to many forms of media, specific broadcast channels, and any other form or media or device can be established. Using the screen 500, preferences can be set, changed, and revised as desired. Also, the set of authority attributes 510 is only one example of preferences available to be established in such a system.

FIG. 5B shows another way that preferences can be established. FIG. 5B shows an input screen 550 which, for example, may be accessed when new media is made available through the media server 410 (FIG. 4A). Upon loading of the media, a user of the screen 550 can establish by marking device preferences 552 which devices (and associated users, as previously discussed) can access the media content just made available, whether that media is a movie, a television channel, a CD, a photograph or a set of photographs, or another type of media. Alternatively, or at the same time, a user of the screen 550 can assign authority attributes 554 for the media just made available. The user can specify whether the media is adult in nature. The user can specify whether the media is audio media, video media, or both. The user also could choose to assign the media to a privacy archive as previously described. There are many ways in which media access can be controlled using embodiments of the present invention.

Figure 6:
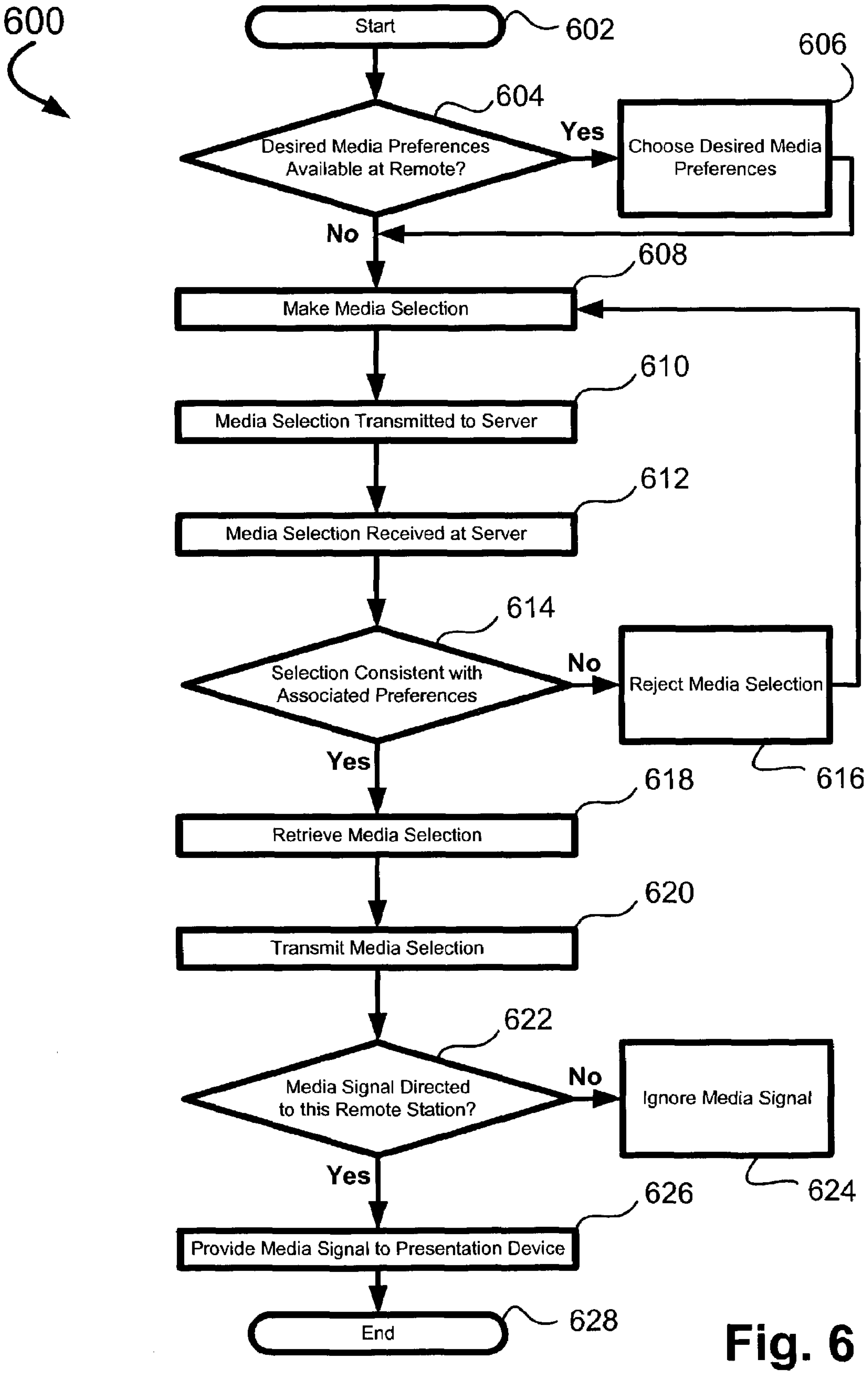
FIG. 6 is a flowchart of a routine for accessing media files at a remote location from a server according to an embodiment of the present invention.

FIG. 6 is a flowchart of a routine 600 for using an embodiment of the present invention. Control determinations manifested at decision blocks are performed by control logic within the software module loaded on the computer 102.

The routine 600 begins at a block 602. A first part of the routine takes place at a remote media station. At a decision block 604, it is determined by the software module if there are selectable media preferences associated with the control initiating the media request. As previously described, some media preferences may be predetermined by the capability of the media device, such as if the media device is an audio-only device such as a stereo. In addition, the user may be able to identify a preference list to avail himself or herself of desired media selections, media unavailable to other system users, etc. Selection or verification of preferences may be initiated at a remote media station but may engage the server.

If such preferences are determined to available at the block 604, at a block 606 the user can identify his or her preference list or select from among available preference lists displayed on a television or a computer monitor as previously described. In either case, at a block 608 the user makes a media selection, such as one or more photographs, music tracks, videos, etc. One the selection is made, at a block 610 the media selection is transmitted to the server. As previously described, the media selection can be sent directly to the server from a remote control unit or sent to the server from a remote control unit via a remote module.

Turning to functions taking place at the server, at a block 612 the media selection request is received at the server. At this point, at a decision block 614, it is determined by the software module if the selection made is consistent with preferences associated with the remote media station from which the media selection was made. Again, as was previously described, the remote media station may be limited to certain types of media, or a user or station might be locked out from certain types of content as a result of a set of media preferences associated with the identifier associated with the control initiating the media request. If the selection is determined at the block 614 to not be consistent with the associated media preferences, at a block 616 the media selection is rejected. The routine 600 then loops to the block 608 for the user to make another selection. On the other hand, if the media selection is determined at the block 614 to be consistent with associated media preferences, at a block 618 the media selection is retrieved from the server. Once the media selection is retrieved, at a block 620 a media signal representing the media selection is transmitted to the remote media station.

At a decision block 622 it is determined by the remote media receiver if the media signal is directed to the remote media station. As previously described, multiple remote media stations may communicate with the server, thus it is possible that server may direct media selections to another remote media station. If the media signal is not directed to the present remote media station, the media signal is ignored at a block 624. On the other hand, if the media signal is directed to the present remote media station, at a block 626 the media signal is received and provided to the media presentation unit for playback. At a block 628, the routine 600 then ends. The routine 600 can be reiterated to identify a number of desired media selections.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for identifying and transmitting compatible media stored on a media server in response to individual media requests from a plurality of different media stations, the system comprising:

a first media station having a first media transmitter operable to transmit a first media request that includes a first media type identifier;

a second media station having a second media transmitter operable to transmit a second media request that includes a second media type identifier; and a media server comprising:

a memory storing a plurality of media of different media types;

a receiver for receiving the first and second media requests;

a processor for identifying compatible media in the memory based on each of the first and second media type identifiers; and a transmitter for transmitting the identified compatible media to each of the first and second media stations, wherein the first media station is a stereo operable to play only audio media content, wherein the first media type identifier indicates only an audio media type, wherein the second media station is a television operable to play broadcast cable or satellite television content, wherein the second media type identifier indicates a broadcast audiovisual media type, wherein the first remote media transmitter of the stereo includes a remote control device capable of making media selections from the media server, and wherein the remote control device of the stereo utilizes a visual display of the television to make media selections.

2. The system of claim 1, wherein the first and second media requests include user identifiers indicating various user defined media preferences associated with users of the first and second media transmitters.

3. The system of claim 2, wherein the user defined media preferences include media subject preferences, such that a user of the first or second media transmitter is able to make media selections based on a customized listing of media corresponding to a distinct subject.

4. The system of claim 3, wherein the distinct subject includes a preferred genre of music.

5. The system of claim 2, wherein the user defined media preferences include media discretionary preferences, such that a user of a media transmitter can limit other users from accessing specific media content stored on the memory of the media server.

6. A method for identifying and transmitting compatible media stored on a media server in response to individual media requests from a plurality of different media stations, the method comprising:

storing a plurality of media of different media types in a memory of a media server;

transmitting a first media request to the media server with a first media transmitter of a first media station, the first media request including a first media type identifier;

transmitting a second media request to the media server with a second media transmitter of a second media station, the second media request including a second media type identifier;

receiving the first and second media requests at the media server;

identifying compatible media in the memory based on each of the first and second media type identifiers; and transmitting the identified compatible media to each of the first and second media stations, wherein the first media station is a stereo operable to play only audio media content, wherein the first media type identifier indicates only an audio media type, wherein the second media station is a television operable to play broadcast cable or satellite television content, wherein the second media type identifier indicates a broadcast audiovisual media type, wherein the first media transmitter of the stereo includes a remote control device capable of making media selections from the media server, and wherein the remote control device of the stereo utilizes a visual display of the television to make media selections.

7. The method of claim 6, wherein the first and second media requests include user identifiers indicating various user defined media preferences associated with users of the first and second media transmitters.

8. The method of claim 7, wherein the user defined media preferences include media subject preferences, such that a user of the first or second media transmitter is able to make media selections based on a customized listing of media corresponding to a distinct subject.

9. The method of claim 8, wherein the distinct subject includes a preferred genre of music.

10. The method of claim 7, wherein the user defined media preferences include media discretionary preferences, such that a user of a media transmitter can limit other users from accessing specific media content stored on the memory of the media server.

* * * * *